US012226782B2

(12) United States Patent
Weber et al.

(10) Patent No.: US 12,226,782 B2
(45) Date of Patent: Feb. 18, 2025

(54) CERAMIC POWERED STEEL SHOT MAGNETIC SWEEPER APPARATUS

(71) Applicant: Bluestreak Equipment Inc., Delhi (CA)

(72) Inventors: Brian Weber, Delhi (CA); Shuyue Zhang, Delhi (CA)

(73) Assignee: BLUESTREAK EQUIPMENT INC.

( * ) Notice: Subject to any disclaimer, the term of this patent is extended or adjusted under 35 U.S.C. 154(b) by 0 days.

(21) Appl. No.: 18/398,513

(22) Filed: Dec. 28, 2023

(65) Prior Publication Data

US 2024/0216927 A1 Jul. 4, 2024

Related U.S. Application Data

(60) Provisional application No. 63/436,130, filed on Dec. 30, 2022.

(51) Int. Cl.
*B03C 1/12* (2006.01)
*A47L 13/41* (2006.01)
*B03C 1/033* (2006.01)

(52) U.S. Cl.
CPC ................ *B03C 1/12* (2013.01); *A47L 13/41* (2013.01); *B03C 1/0332* (2013.01); *B03C 2201/20* (2013.01)

(58) Field of Classification Search
CPC .......... A47L 13/40; A47L 13/41; A47L 11/22; B03C 1/0332; B03C 1/12; B03C 2201/20
See application file for complete search history.

(56) References Cited

U.S. PATENT DOCUMENTS 1,326,561 A * 12/1919 Ady .......................... B03C 1/30 451/93
2,455,319 A * 11/1948 Stearns ............... A47L 11/4069 15/3
2,693,279 A * 11/1954 Box ...................... B03C 1/0332 209/215
2,709,002 A * 5/1955 Hoff ........................ A47L 13/41 209/215
3,209,912 A * 10/1965 Sloan ........................ B03C 1/14 209/223.1
3,454,913 A * 7/1969 Israelson ............... B03C 1/0332 335/306
4,272,365 A * 6/1981 Ries ........................ B03C 1/035 209/223.1

(Continued)

*Primary Examiner* — Joseph C Rodriguez

(57) ABSTRACT

A continuous discharge ceramic powered steel shot magnetic sweeper apparatus is disclosed. The magnetic sweeper apparatus consists of at least one handle, a frame, support wheel(s), a frontal debris bin, drive wheels, a finned tube housing a ceramic magnetic assembly. The ceramic magnetic assembly comprises a sealed magnetic drum and rotating non-ferrous finned tubes. The magnet is continuously cleaned off as the magnetic sweeper apparatus is pushed forward. Magnetic debris accumulates on the magnet assembly and is deposited in the frontal debris bin. The magnetic sweeper apparatus design utilizes field differences created by the magnet position and angle to achieve the automatic pick-up and drop-off of debris at different locations of the drum. Furthermore, the apparatus aims to solve this high-cost rare earth magnet problem by using lower cost ceramic magnets as an alternative.

18 Claims, 13 Drawing Sheets

(56) References Cited

U.S. PATENT DOCUMENTS

| | | | | | |
|---|---|---|---|---|---|
| 5,982,261 | A * | 11/1999 | Stowe | B03C 1/12 | 210/222 |
| 6,402,212 | B1 * | 6/2002 | Hsiao | E01H 1/14 | 209/215 |
| 6,592,161 | B1 * | 7/2003 | Hsiao | B25H 3/02 | 209/215 |
| 2012/0111977 | A1 * | 5/2012 | Shuttleworth | B03C 1/18 | 241/24.25 |
| 2013/0240413 | A1 * | 9/2013 | Keaton | B03C 1/10 | 209/214 |
| 2014/0209516 | A1 * | 7/2014 | Reaves | B03C 1/14 | 209/38 |
| 2015/0290656 | A1 * | 10/2015 | Molteni | B03C 1/14 | 209/219 |
| 2021/0087763 | A1 * | 3/2021 | Orbell | B01J 20/165 | |

* cited by examiner

PRIOR ART

| Distance (A) | 0" | 1/4" | 1/2" | 3/4" | 1" | 1 1/4" | 1 1/2" |
|---|---|---|---|---|---|---|---|
| Gauss (G) | 846 | 688 | 574 | 474 | 409 | 352 | 308 |

Note: Gauss (G) shows the maximum gauss measured across the length of the sweeper at each distance from ground.

| Distance (A) | 0" | 1/4" | 1/2" | 3/4" | 1" | 1 1/4" | 1 1/2" |
|---|---|---|---|---|---|---|---|
| Gauss (G) | 704 | 610 | 510 | 417 | 343 | 292 | 243 |

Note: Gauss (G) shows the maximum gauss measured across the length of the sweeper at each distance from ground.

CERAMIC POWERED STEEL SHOT MAGNETIC SWEEPER APPARATUS

CROSS REFERENCE TO RELATED APPLICATIONS

This application claims priority to and the benefit of U.S. Provisional Application Ser. No. 63/436,130, entitled "CERAMIC POWERED STEEL SHOT MAGNETIC SWEEPER APPARATUS", filed on Dec. 30, 2022, the disclosure of which is incorporated herein by reference in its entirety.

BACKGROUND

The field of the disclosure relates to sweeper apparatuses, in particular to a magnetic sweeper apparatus.

A magnetic sweeper apparatus utilizes magnetism to pick up ferrous or metallic objects. However, there are several problems with typical magnetic sweeper apparatuses, including:

Debris contamination—steel shot/debris can get all over the top of the magnet and between the magnet and separating surface, causing it to not function properly—in this invention the completely sealed magnetic drum will not allow shot/debris inside.

Low productivity—traditional magnetic sweepers are slow to use. The magnets and sweeper body are fixed during sweeping. When the sweeper body is fully covered by metal debris, steel shot, nails, etc., its pick up strength is greatly reduced. Therefore, the operator needs to stop often to clean the sweeper, debris must be released from the bottom of the magnet onto something like the floor, and then be picked up again with something like a shovel and disposed of into a bin or trash container. And because a traditional magnet loses strength as more debris is collected, the area swept usually must be swept several times. In this invention the magnet never loses strength, and debris is deposited into an easily removable on-board debris bin which can be grabbed when full and dumped directly into a debris bin.

Degrading performance as used—in traditional magnetic sweepers the magnet slowly loses strength as increased debris is collected as the magnet is moved over debris.

Operator ease of use—the operation described above involved significant operator effort. The operator must judge when the magnet is full on the bottom and then stop and clean it off onto the floor, then scoop up the debris or shot again with a shovel or other device and dump it into a bucket or machine again. Because normal magnets slowly lose pickup power as they are pushed along and pick up steel shot or debris, they start to miss picking up all debris, so the operator usually must go over areas several times to get all the material picked up.

Currently, continuous discharge magnetic sweeper apparatuses (such as Bluestreak's Theta, Fission, Atmos and Quantum) use rare earth magnets for the magnet assembly. These devices are small, light and strong, but also relatively expensive due to the high cost of the rare earth magnets. Due to their small size, one needs to use many blocks to fill out the entire span of the sweeper and produce a magnetic field large enough to provide the necessary performance. When the size of the sweeper is bigger, this can significantly increase the cost of the product.

There is a desire to provide an improved magnetic sweeper that addresses concerns related to debris contamination, low productivity, degrading performance and ease of use, as well as a low-cost rare earth magnet alternative.

SUMMARY

Figure 1:
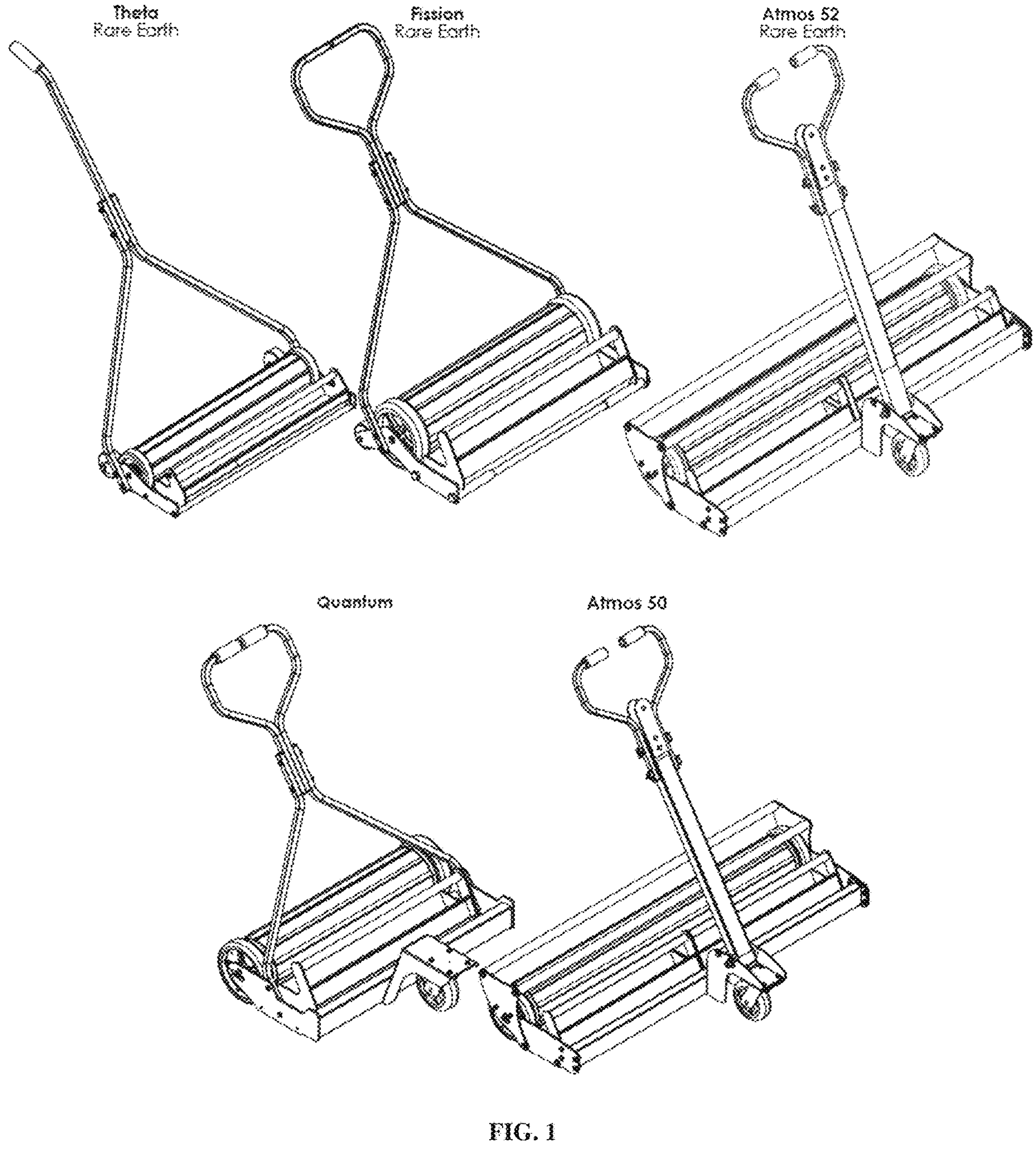
FIG. 1 is a line diagram of perspective views of embodiments of rare earth magnetic sweeper apparatuses.

A continuous discharge ceramic powered steel shot magnetic sweeper apparatus is disclosed. The magnetic sweeper apparatus consists of push handles, a frame, support wheel(s), frontal debris bin(s), drive wheels, and an enclosed finned tube housing a ceramic magnetic assembly. The ceramic magnetic assembly comprises a stationary ceramic magnet assembly that is inside a sealed rotating non-ferrous finned tube and the ceramic magnet power is continuously renewed as the magnetic sweeper apparatus is pushed forward. Ferrous debris accumulates on the bottom of the finned tube and is then deposited in the frontal debris bin. The magnetic sweeper apparatus design utilizes field differences created by the magnet position and angle to achieve the automatic pick-up and drop-off of debris at different locations of the finned tube. Furthermore, the apparatus aims to solve the problem of the high cost of rare earth magnets by using lower cost ceramic magnets as an alternative.

DETAILED DESCRIPTION

According to the disclosure, an improved magnetic sweeper that addresses debris contamination, low productivity, degrading performance, ease of use and lower cost is disclosed. According to the disclosure, a sealed non-magnetic finned tube that will not allow shot/debris inside is used.

According to the disclosure, the magnet never loses strength, and debris is deposited into an easily removable on-board debris bin which can be grabbed when full and dumped directly into another debris bin. According to the disclosure, the magnet is always near full strength because the magnet is continuously cleaned off as it is pushed forward.

This disclosure aims to address the difficulties in clean off by implementing a nonmagnetic rotary finned tube, and by creating a difference in the magnetic field around the tube at the bottom (strongest) and clean off (weakest) points.

According to the disclosure, to provide a lower cost alternative to rare earth magnets, ceramic magnets have been considered. The existing high power, higher cost rare earth magnets have been replaced with low cost, lower energy ceramic magnets. The ceramic magnets naturally have a field strength that is weaker than the rare earth magnets; however, their price is much lower than that of the rare earth magnets.

The disclosure uses a stationary hanging ceramic magnet assembly that is suspended inside the nonmagnetic rotating finned tube. The tube has fins around its perimeter that run the full length of the tube, which is driven by 2 wheels, which rotates the finned tube around the stationary magnet.

It is known that, increasing the size of any type of magnet assembly can increase the magnetic field strength and size. Several different ceramic magnet arrangements have been developed that can produce similar magnetic field strength to their rare earth counterparts while maintaining the same operational characteristics. Therefore, several ceramic magnet assemblies with an alternating magnetic field arrangement will produce the same operational characteristics as their rare earth alternatives for each of the current rare earth continuous discharge products.

There is an onboard bin that travels in a fixed position in front of the finned rotating drum, which is where the steel shot (metal debris) will be discharged into. By adjusting the size, position and angle of the magnet assembly, the sweeper will have a strong field at the bottom and back side, allowing it to be able to pick up steel shot (primary use) and hold onto the shot on the back side of the finned tube as it is conveyed around the top where it will have a weak field, so that the shot is not held as well by magnetic force, and will be discharged into the bin automatically due to gravity. The fins on the tube will also function as scoops to assist in holding the shot during the travel, and they also act as ramps when moving slowly to guide the shot into the bin during the discharge.

This will free the operator from the need to stop often for clean off, and the bin will make it easier for the operator to pick up and dump the debris elsewhere. Also, by cleaning off continuously during the operation, the magnetic field strength at the pick-up location will not be reduced due to sweeper body covered by debris. In other words, the magnet is always near full strength during operation. This also eliminates the need to go over areas multiple times to get all the debris picked up.

FIG. 1 is a line diagram of perspective views of embodiments of rare earth magnetic sweeper apparatuses. According to FIG. 1, several existing rare earth magnet sweeper apparatus (i.e., Theta, Fission, Atmos and Quantum) are shown.

Figure 2:
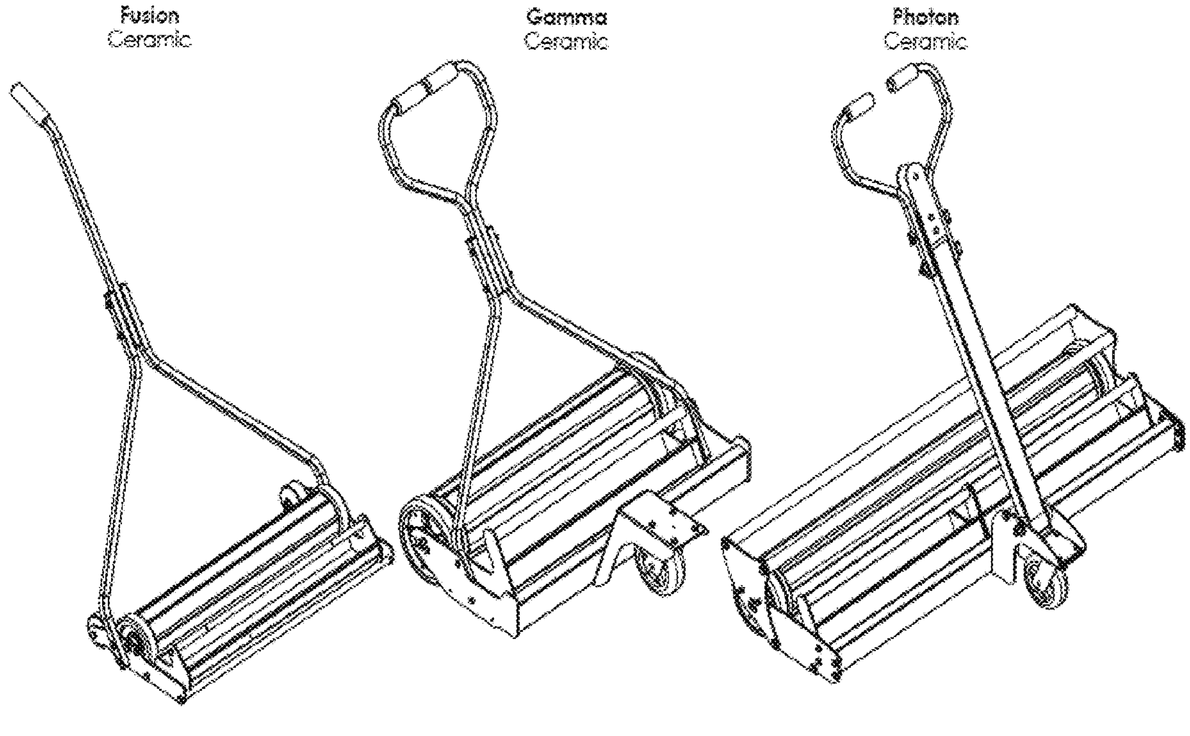
FIG. 2 is a line diagram of perspective views of embodiments of ceramic magnetic sweeper apparatuses.

FIG. 2 is a line diagram of perspective views of embodiments of ceramic magnetic sweeper apparatuses. According to FIG. 2, three ceramic magnet sweeper apparatus (i.e., Fusion, Gamma, and Photon) are shown. Additional variants are possible.

Figure 3:
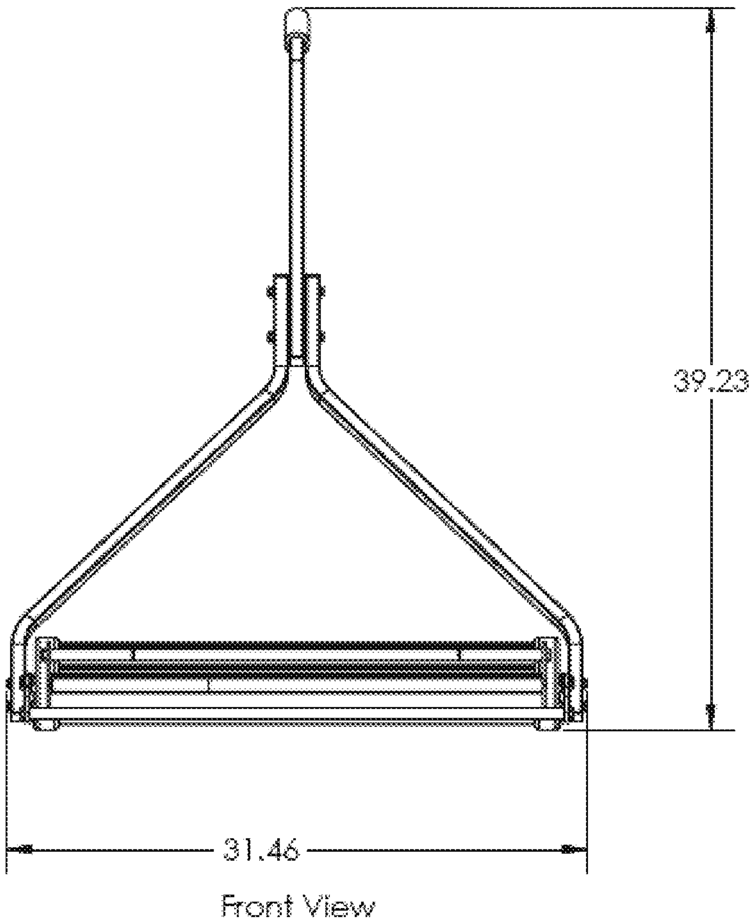
FIG. 3 is a line diagram of a front plan view of a ceramic magnetic sweeper apparatus.

FIG. 3 is a line diagram of a front plan view of a ceramic magnetic sweeper apparatus. According to FIG. 3, the dimensions of the magnetic sweeper apparatus (i.e., Fusion) may be 31.46" wide and 39.23" height.

Figure 4:
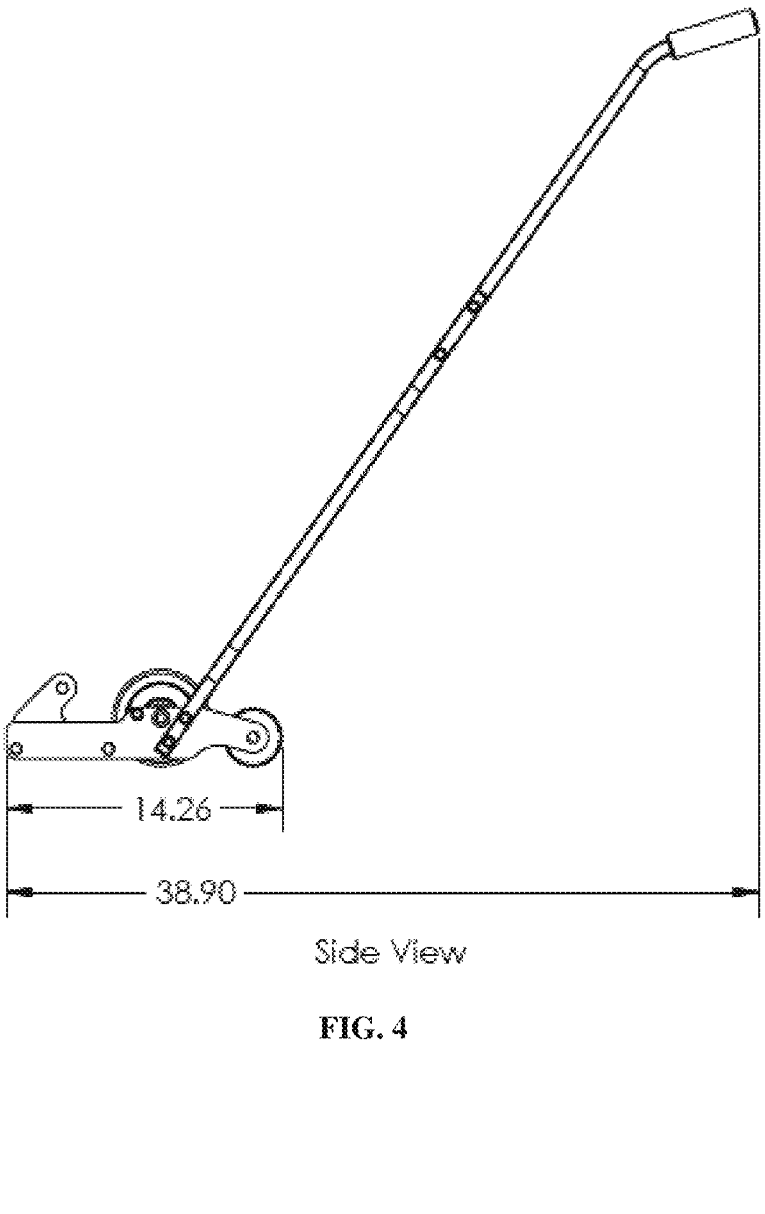
FIG. 4 is a line diagram of a right-side view of a ceramic magnetic sweeper apparatus.

FIG. 4 is a line diagram of a right-side view of a ceramic magnetic sweeper apparatus. According to FIG. 4, the side view dimensions of the magnetic sweeper apparatus (i.e., Fusion) may be 14.26" from the front to the back wheel and 38.90" from the front to the tip of the handle.

Figure 5:
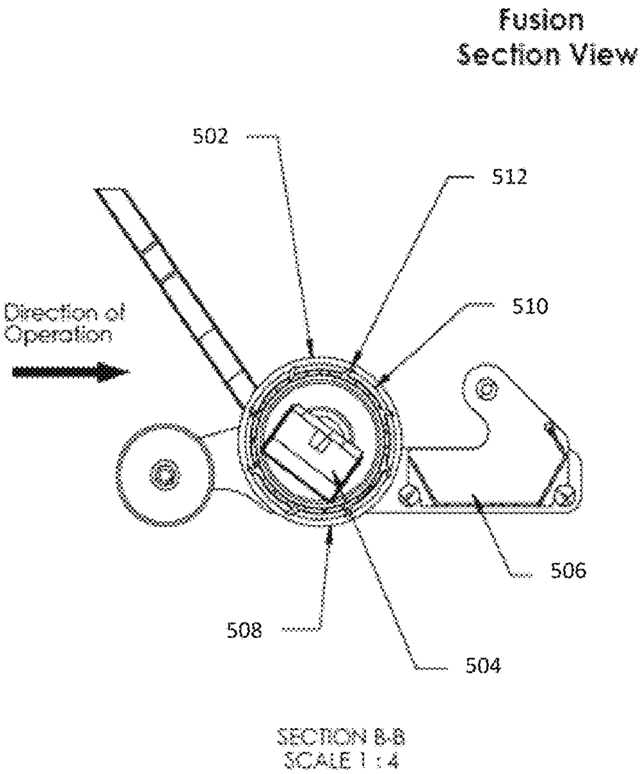
FIG. 5 is a line diagram of a sectional view of a ceramic magnetic sweeper apparatus.
Figure 5:
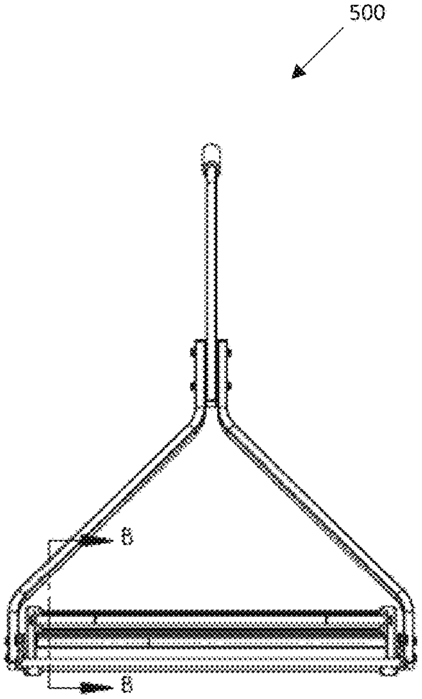

FIG. 5 is a line diagram of a section view of a magnetic sweeper apparatus. According to FIG. 5, a section right side view of section B-B is shown. The magnetic sweeper apparatus 500 consists of a drive wheel 502 which supports the product weight and drives the finned tube, a stationary ceramic magnet assembly 504, a rotating non-ferrous finned tube 512, a debris bin 506 where steel shots are collected.

According to FIG. 5, the ceramic magnet assembly generates a strong magnetic field at the bottom 508 and a weaker magnetic field at the top 510 due to the steel shielding of the magnet assembly.

Figure 6:
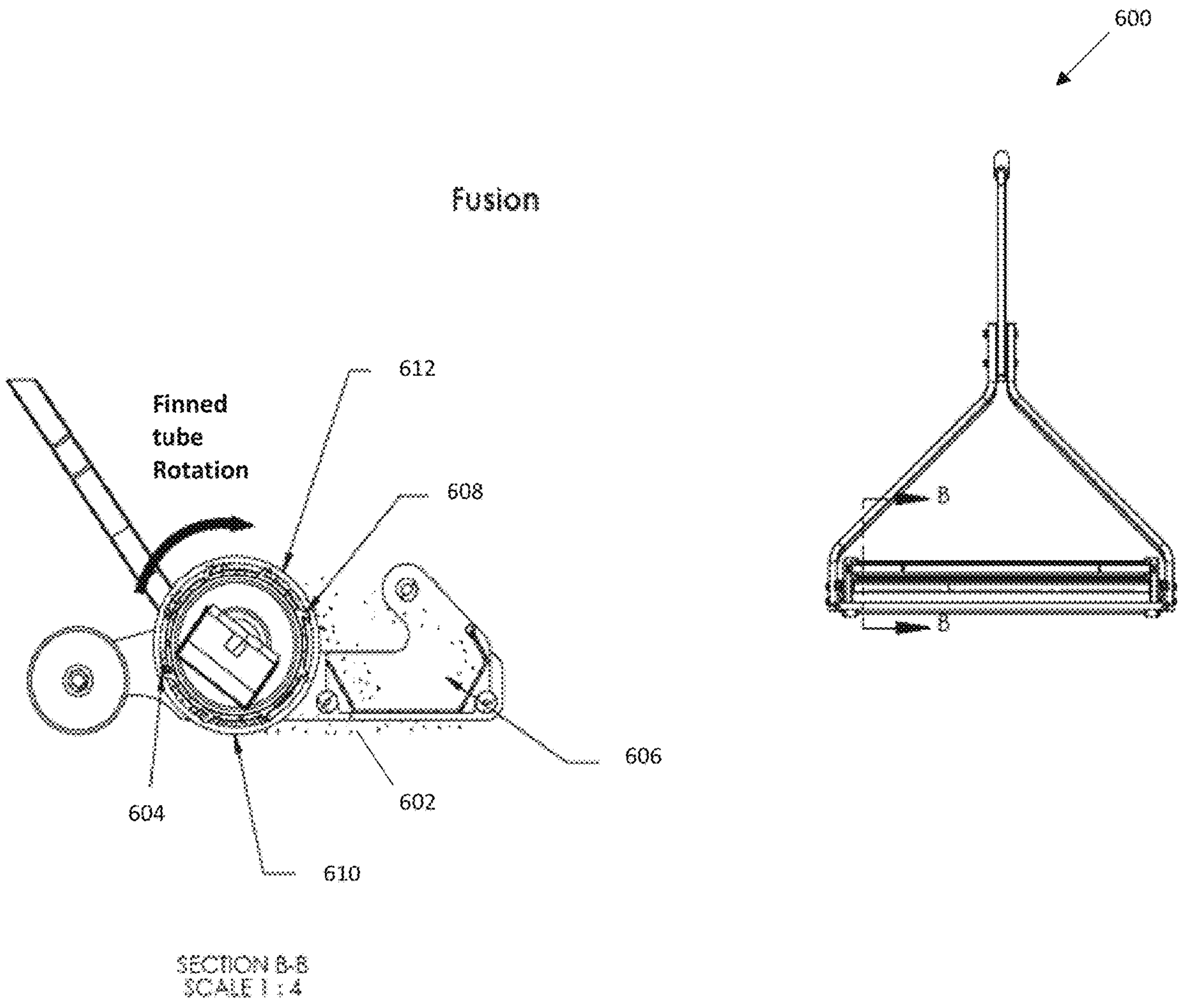
FIG. 6 is a line diagram of a further sectional view of a ceramic magnetic sweeper apparatus.

FIG. 6 is a line diagram of a further section view of a magnetic sweeper apparatus. According to FIG. 6, a section right side view of section B-B is shown. The magnetic sweeper apparatus 600 moves in the finned tube rotation direction where debris (e.g., steel shots 602) are discharged in a debris bin 606 on the magnetic sweeper apparatus 600. Fins at the back 604 function as scoops to help hold the steel shots 602 during transportation. Fins at the front 608 function as ramps to help guide the steel shots 602 into the debris bin 606.

According to FIG. 6, steel shots 602 are picked up by the strong magnetic field at the bottom 610. Furthermore, the weak magnetic field on the top 612 allows the steel shots 602 to separate from the finned tube and discharge into the bin 606.

Figure 7:
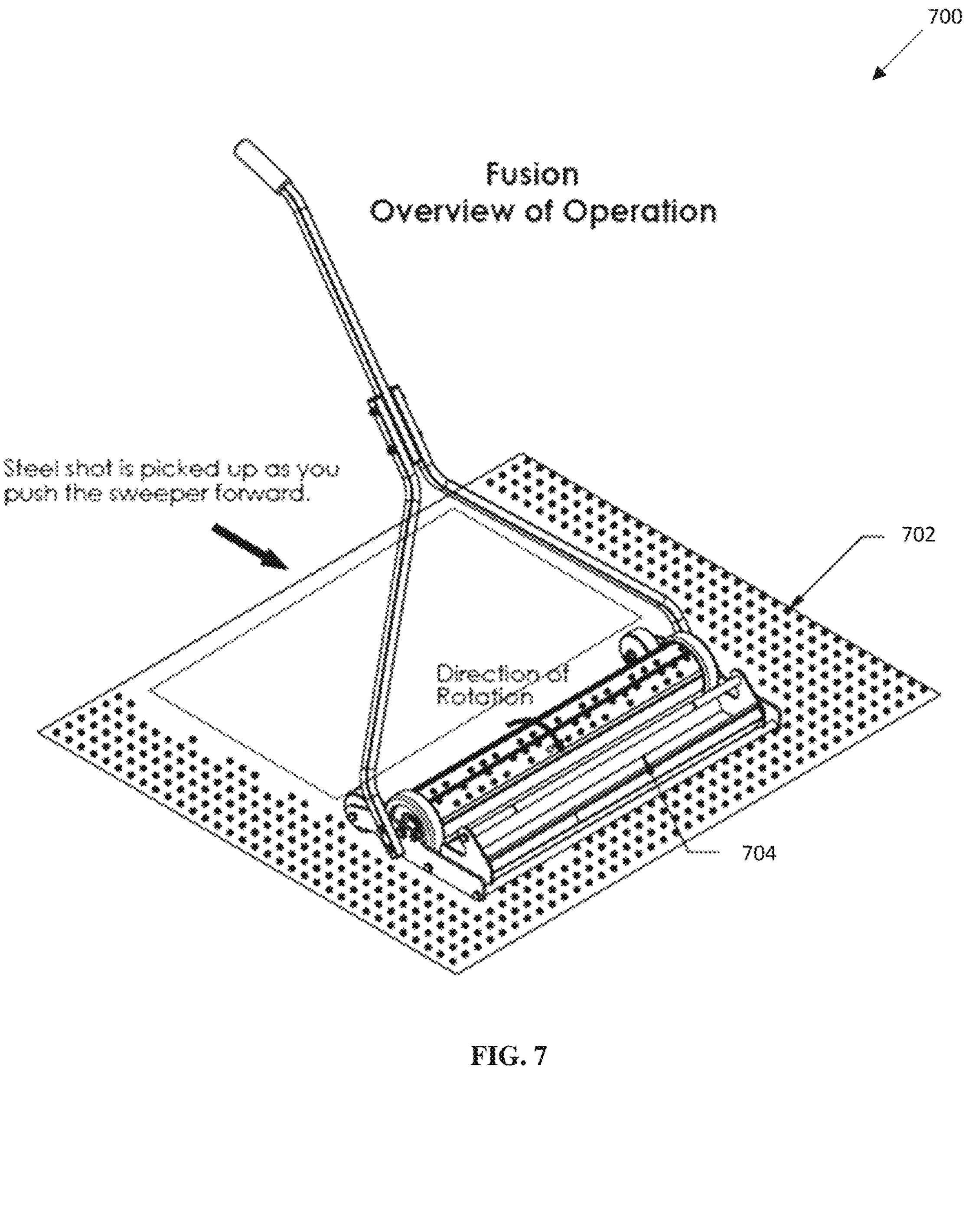
FIG. 7 is a diagram illustrating the operation overview of a ceramic magnetic sweeper apparatus.

FIG. 7 is a diagram illustrating the operation overview of a ceramic magnetic sweeper apparatus. According to FIG. 7, the floor of a sample area is covered with steel shot debris 702. Steel shots 702 are picked up as the user pushes the sweeper forward. Steel shots 702 are discharged into the debris bin 704 automatically as the sweeper is being pushed forward.

Figure 8:
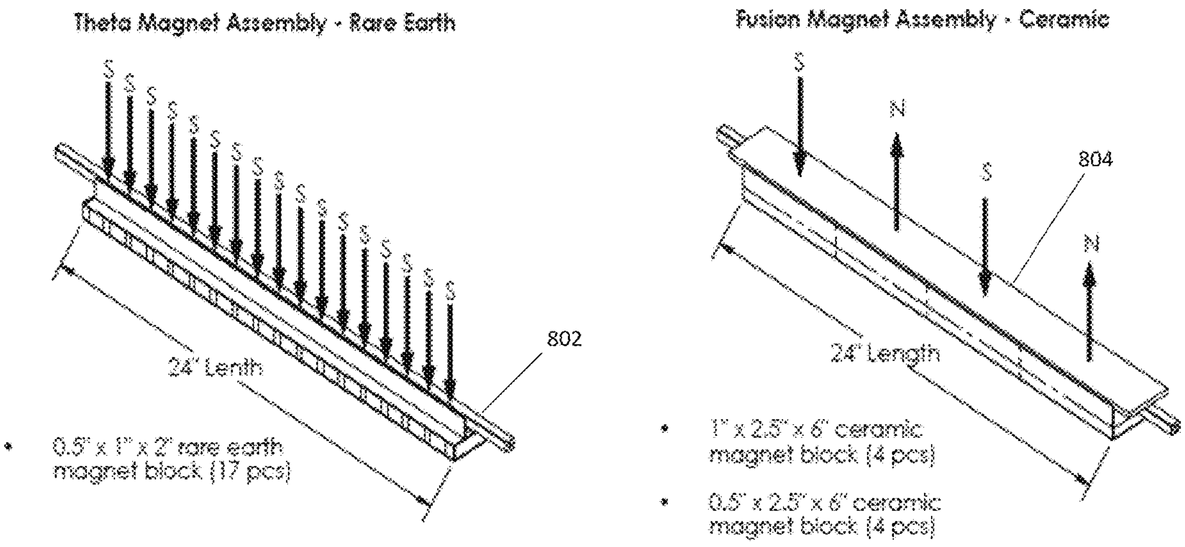
FIG. 8 is a diagram illustrating examples of the magnetization direction of rare earth and ceramic magnets.

FIG. 8 is a diagram illustrating the magnetization direction of small size comparable performance rare earth and ceramic magnet assemblies. According to FIG. 8, a rare earth magnet assembly 802 (i.e., Theta) and a ceramic magnet assembly (i.e., Fusion) 804 are shown. The rare earth magnet assembly 802 has a length of 24", consisting of rare earth magnet block consisting of 17 pieces with dimensions of 0.5" length, 1" width and 2" height. The magnets in the rare earth magnet assembly are all magnetized in the same direction (i.e., south).

According to FIG. 8, a ceramic magnet assembly 804 has a length of 24", consisting of different size ceramic magnetic blocks. According to FIG. 8, there are 4 pieces of ceramic magnet block with dimensions of 1" length, 2.5" width and 6" height and 4 pieces of ceramic magnet block with dimensions of 0.5" length, 2.5" width and 6" height. Furthermore, the magnets in the ceramic magnet assembly are magnetized in alternating directions (i.e., alternating between south and north).

Figure 9:
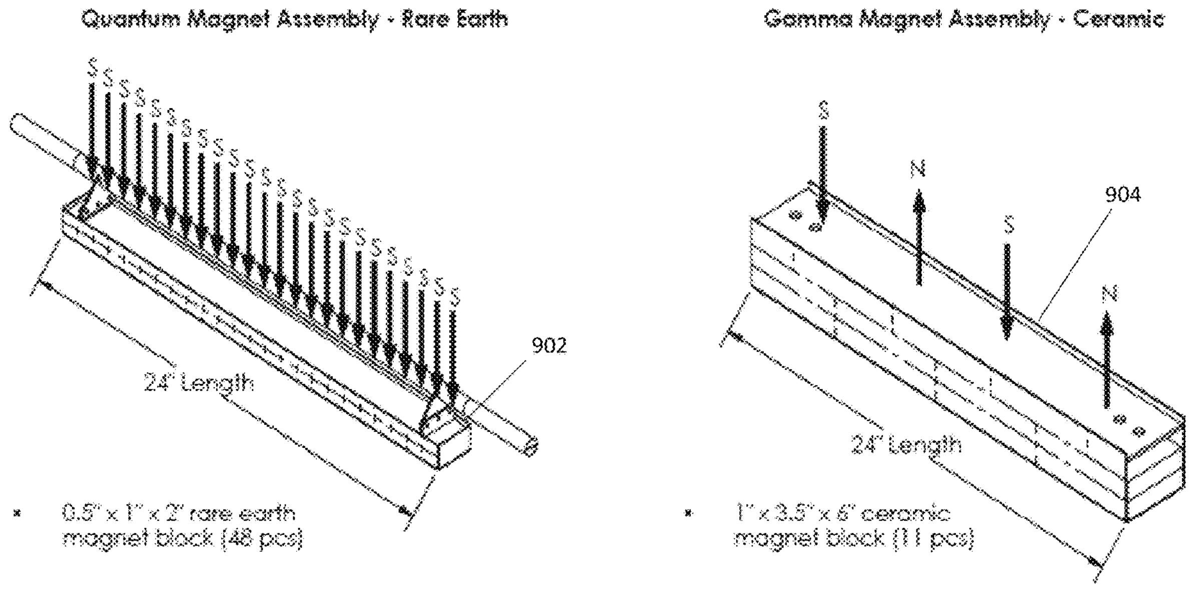
FIG. 9 is a diagram illustrating further examples of the magnetization direction of rare earth and ceramic magnets.

FIG. 9 is a diagram illustrating further magnetization direction of a medium size comparable performance rare earth and ceramic magnet assemblies. According to FIG. 9, a rare earth magnet assembly 902 (i.e., Quantum) and a ceramic magnet assembly 904 (i.e., Gamma) is shown. The rare earth magnet assembly 902 has a length of 24", consisting of rare earth magnet block consisting of 48 pieces with dimensions of 0.5" length, 1" width and 2" height. The magnets in the rare earth magnet assembly are all magnetized in the same direction (i.e., south).

According to FIG. 9, a ceramic magnet assembly 904 has a length of 24", consisting of 11 pieces of ceramic magnet block with dimensions of 1" length, 3.5" width and 6" height. The magnets in the ceramic magnet assembly are magnetized in alternating directions (i.e., alternating between south and north).

According to FIGS. 8 and 9, if the entire magnet assembly is reversed (i.e., all indicated magnetization directions are reversed), both the rare earth magnet assembly and the ceramic magnet assembly will still have the same strength.

Figure 10:
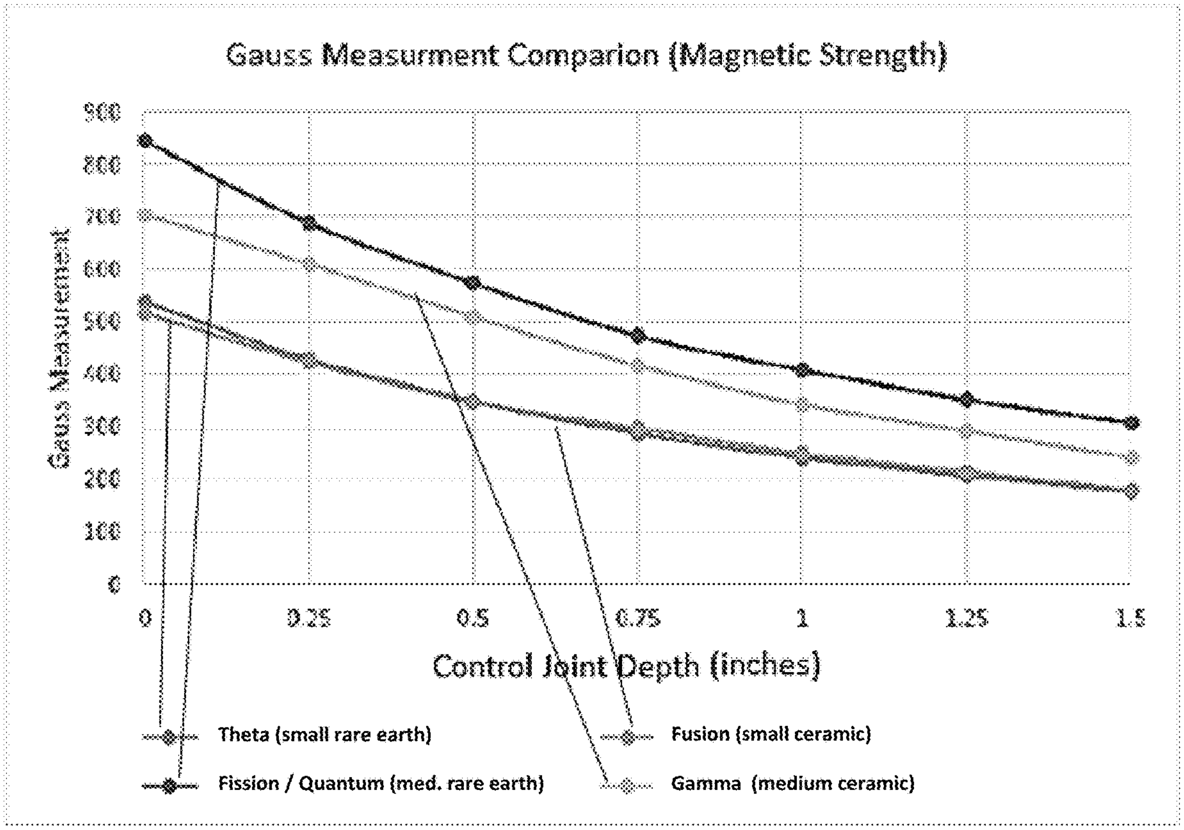
FIG. 10 is a diagram illustrating the comparison of rare earth and ceramic magnet field.

FIG. 10 is a diagram illustrating the comparison of rare earth and ceramic magnet field magnetic sweepers. According to FIG. 10, a chart is shown comparing the maximum field for a small rare earth (Theta), a small ceramic (Fusion), a medium rare earth (Fission/Quantum) and a medium ceramic (Gamma).

According to FIG. 10, the Gauss Measurement (i.e., magnetic field strength) reduces when the distance from the magnet increases. The magnetic field strength of each product is graphed starting at the ground (0") for each product. For example, each product is strongest at the ground surface. The magnetic strength decreases as you move further away from the product (down into a control joint for example).

Figure 11:
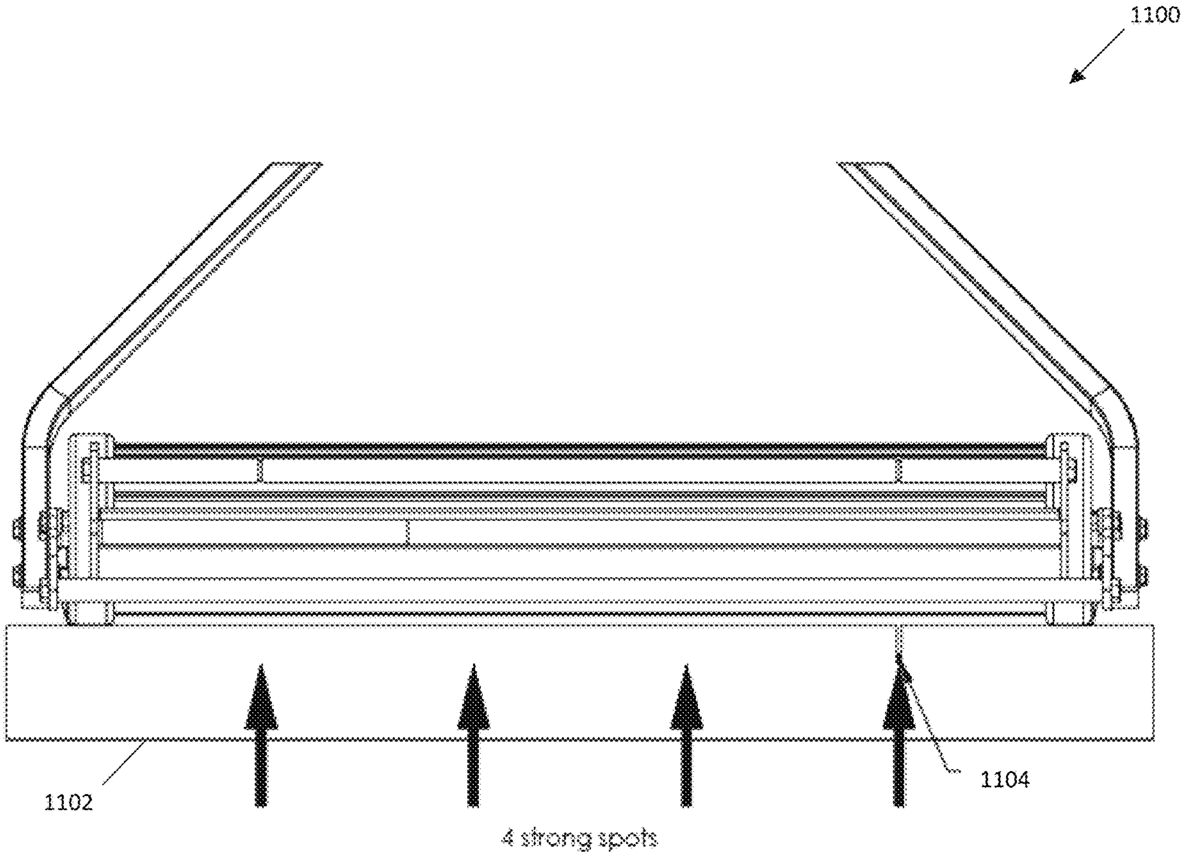
FIG. 11 is a line drawing illustrating a front plan view of a ceramic magnetic sweeper apparatus with alternating magnet arrangement.

FIG. 11 is a line drawing illustrating a front plan view of a ceramic magnetic sweeper apparatus with alternating magnet arrangement. According to the disclosure, a front plan view of a ceramic magnetic sweeper apparatus 1100 is shown with 4 strong spots on the ground 1102 with a steel shot in a ground crack 1104 (control joint). The alternating magnet arrangement creates 4 strong spots in the magnetic field of the assembly. Those strong spots can be used to pick up shot from ground cracks or control joints.

Figure 12:
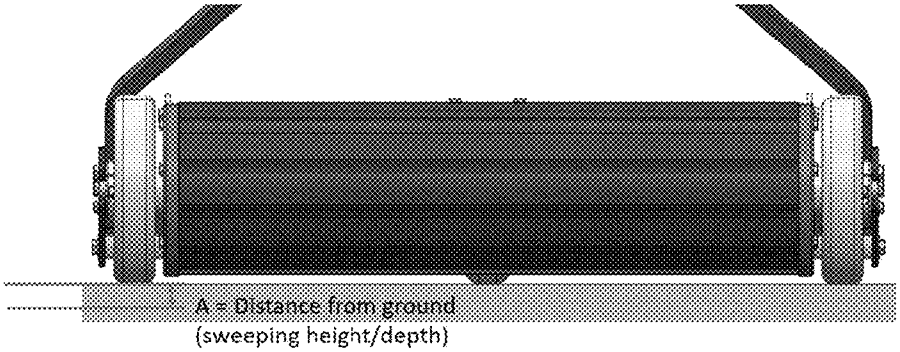
FIG. 12 is a diagram that illustrates the Gauss (G) measurements for the magnetic strength of the medium size continuous discharge sweeper with rare earth magnet assembly.

According to the disclosure, the magnets used in the continuous discharge sweeper can be Neodymium 42 rare earth magnets or Ceramic 8 magnets. FIG. 12 is a diagram that illustrates the Gauss (G) measurements for the magnetic strength of the Neodymium 42 rare earth magnet assembly for the medium size continuous discharge sweeper. According to FIG. 12, sweeping height A is the distance from the magnet. The following table (also shown in FIG. 12) illustrates the relationship between sweeping height and magnet strength (in Gauss):

| Distance A | 0" | ¼" | ½" | ¾" | 1" | 1¼" | 1½" |
|---|---|---|---|---|---|---|---|
| Peak Gauss (G) | 846 | 688 | 574 | 474 | 409 | 352 | 308 |

Figure 13:
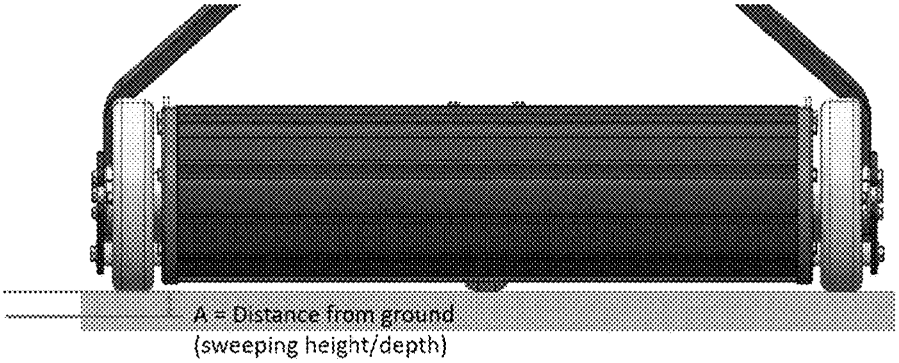
FIG. 13 is a diagram that illustrates the Gauss (G) measurements for the magnetic strength of the medium size continuous discharge sweeper with ceramic magnet assembly.

According to the disclosure, the magnets used in the continuous discharge sweeper can be Neodymium 42 rare earth magnets or Ceramic 8 magnets. FIG. 13 is a diagram that illustrates the Gauss (G) measurements for the magnetic strength of the Ceramic 8 magnet assembly for the medium size continuous discharge sweeper. According to FIG. 13, sweeping height A is the distance from the magnet. The following table (also shown in FIG. 13) illustrates the relationship between sweeping height and magnet strength (in Gauss):

| Distance A | 0" | ¼" | ½" | ¾" | 1" | 1¼" | 1½" |
|---|---|---|---|---|---|---|---|
| Peak Gauss (G) | 704 | 610 | 510 | 417 | 343 | 292 | 243 |

According to the disclosure, the aforementioned magnetic sweeper apparatus utilizes field differences created by the magnet position and angle to achieve the automatic pick-up and drop-off of debris at different locations of the drum.

According to the disclosure, the magnet assembly is fully enclosed by the finned tube and two wheels. This avoids the problem where shot could get into the open transmission system and affect the apparatus' operation. The simple connection between finned tube and wheel by compression or by additional parts is reliable ensuring the magnet assembly is fully enclosed. In contrast, with a conveyor belt, system debris can get between the conveyor belt and the rotating pulleys.

According to the disclosure, the magnetic field is non-uniform around the finned tube, and there is a significant difference between the field at the pick-up location and clean-off location.

Furthermore, the magnet assembly is placed at an angle so that the magnetic field at the bottom and back side is stronger than the front. This allows the shot to be held on the fined tube on the back side during transportation, and it prevents the shot from being captured by the field again at the front side during discharge.

According to the disclosure, the finned rotating tube surrounding the magnet also rotates at the same revolutions per minute (RPM) as the wheels that drive it. This allows the finned tube to be nearly as large in diameter as the wheel that is driving it, which correspondingly allows the fixed magnet inside the tube to be as close to the ground as possible which provides a strong magnetic field. The closer the magnet is to the ground, the closer it will be to the steel shot it is picking up and this relates to better product performance.

According to the disclosure, due to the alternating arrangement of the magnets, the magnetic field of the ceramic continuous discharge sweeper will not be the same (linear) across as the rare earth version. Instead, it will have several 'strong' spots and 'weak' spots. The steel shot picked up by the sweeper will show a clear sinusoidal (wave) pattern on the sweeper, which is a special characteristic that can be used for identification.

According to the disclosure, precision operation of the magnet sweeper apparatus requires a combination of factors including magnet grade, magnet size, charging orientation, drum size, magnet angle, drum to floor height. Optimal configuration of all these factors will provide for optimal performance.

According to the disclosure, a continuous discharge ceramic powered magnetic sweeper apparatus, configured for sweeping of metallic debris is disclosed. The apparatus comprises at least one handle, a frame connected to the handle, at least one support wheel, a frontal debris bin, a plurality of drive wheels and a finned tube housing a magnetic assembly. The magnetic assembly further comprises one or more magnets, a sealed magnetic drum and one or more rotating non-ferrous finned tubes. The magnet is continuously cleaned off as the magnetic sweeper apparatus is pushed forwards or backwards in the direction of operation. The magnetic debris accumulates on the magnet assembly and is deposited in the frontal debris bin. The apparatus design utilizes field differences created by the magnet position and angle to achieve the automatic pick-up and drop-off of debris at different locations of the drum.

According to the disclosure, the magnet assembly is configured to house rare earth or ceramic magnets. The dimension of the apparatus is at least 31.46" wide and 39.23"

height. The dimension of the apparatus from the front to the back wheel is 14.26" and the dimension from the front to the tip of the handle is 38.90".

According to the disclosure, the magnetic assembly further comprises finned tubed wherein the fins at the back function as scoops to help hold the steel shots during transportation and the fins at the front function as ramps to help guide the steel shots into the debris bin.

According to the disclosure, the metallic debris include steel shots. The metallic debris is picked up by the strong magnetic field at the bottom of the apparatus and the weak magnetic field on the top allows the steel shots to separate from the finned tube and discharge into the debris bin.

According to the disclosure, the magnet assembly has a length of 24", consisting of rare earth magnet block consisting of 17 pieces with dimensions of 0.5" length, 1" width and 2" height and the magnet assembly are all magnetized in the same direction. An alternate magnet assembly has a length of 24", consisting of different size ceramic magnetic blocks, the ceramic magnetic blocks having dimensions of 1" length, 2.5" width and 6" height, or 0.5" length, 2.5" width and 6" height and the ceramic magnets are magnetized in alternating directions, alternating between south and north.

According to the disclosure, the magnetization directions are reversed in magnet assembly wherein both the rare earth magnet assembly and the ceramic magnet assembly will still have the same strength.

According to the disclosure, a method of sweeping metallic debris, using a continuous discharge ceramic powered magnetic sweeper apparatus, the apparatus comprising a handle, a frame, a support wheel, a frontal debris bin, drive wheels, a finned tube housing a magnetic assembly is disclosed. The method comprising the steps of operating the apparatus forward or backwards, attracting metallic debris on the ground to the bottom surface of the apparatus, lifting the metallic debris in the rotation of operation as the drive wheel housing rotates in the same direction and depositing the metallic debris into the debris bin. The magnet is continuously cleaned off as the magnetic sweeper apparatus is pushed forwards in the direction of operation. The magnetic debris picks up by the magnet assembly and is deposited in the frontal debris bin and the apparatus design utilizes field differences created by the magnet position and angle to achieve the automatic pick-up and drop-off of debris at different locations of the drum.

According to the disclosure, the magnet assembly of the method is configured to house rare earth or ceramic magnets. The dimension of the apparatus is at least 31.46" wide and 39.23" height. The dimension of the apparatus of the method from the front to the back wheel is 14.26" and the dimension from the front to the tip of the handle is 38.90".

The magnetic assembly of the method further comprises finned tubed wherein the fins at the back function as scoops to help hold the steel shots during transportation and the fins at the front function as ramps to help guide the steel shots into the debris bin.

According to the disclosure, the metallic debris includes steel shots. The metallic debris is picked up by the strong magnetic field at the bottom of the apparatus and the weak magnetic field on the top allows the steel shots to separate from the finned tube and discharge into the debris bin.

According to the disclosure, the magnet assembly of the assembly has a length of 24", consisting of rare earth magnet block consisting of 17 pieces with dimensions of 0.5" length, 1" width and 2" height and the magnet assembly are all magnetized in the same direction. An alternate magnet assembly of the method has a length of 24", consisting of different size ceramic magnetic blocks, the ceramic magnetic blocks having dimensions of 1" length, 2.5" width and 6" height, or 0.5" length, 2.5" width and 6" height and the ceramic magnets are magnetized in alternating directions, alternating between south and north. The magnetization directions are reversed in magnet assembly wherein both the rare earth magnet assembly and the ceramic magnet assembly will still have the same strength.

While some embodiments or aspects of the present disclosure may be implemented in fully functioning mechanical, electrical and electrical-mechanical systems, other embodiments may be considered.

The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

The specific embodiments described above have been shown by way of example and understood is that these embodiments may be susceptible to various modifications and alternative forms. Further understood is that the claims are not intended to be limited to the forms disclosed, but to cover all modifications, equivalents, and alternatives falling within the spirit and scope of this disclosure. While the foregoing written description of the system enables one of ordinary skill to make and use what is considered presently to be the best mode thereof, those of ordinary skill will understand and appreciate the existence of variations, 11 combinations, and equivalents of the specific embodiment, method, and examples herein. The system should therefore not be limited by the above-described embodiment, method, and examples, but by all embodiments and methods within the scope and spirit of the system. Thus, the present disclosure is not intended to be limited to the implementations shown herein but is to be accorded the widest scope consistent with the principles and novel features disclosed herein.

Information as herein shown and described in detail is fully capable of attaining the above-described object of the present disclosure, the presently preferred embodiment of the present disclosure, and is, thus, representative of the subject matter which is broadly contemplated by the present disclosure. The scope of the present disclosure fully encompasses other embodiments which may become obvious to those skilled in the art, and is to be limited, accordingly, by nothing other than the appended claims, wherein any reference to an element being made in the singular is not intended to mean “one and only one” unless explicitly so stated, but rather “one or more.” All structural and functional equivalents to the elements of the above-described preferred embodiment and additional embodiments as regarded by those of ordinary skill in the art are hereby expressly incorporated by reference and are intended to be encompassed by the present claims.

Moreover, no requirement exists for a system or method to address each problem sought to be resolved by the present disclosure, for such to be encompassed by the present claims. Furthermore, no element, component, or method step in the present disclosure is intended to be dedicated to the public regardless of whether the element, component, or method step is explicitly recited in the claims. However, various changes and modifications in form, material, workpiece, and fabrication material detail may be made, without departing from the spirit and scope of the present disclosure, as set forth in the appended claims, as may be apparent to those of ordinary skill in the art, are also encompassed by the present disclosure.

What is claimed is:

1. A continuous discharge ceramic powered magnetic sweeper apparatus, configured for sweeping of metallic debris, the apparatus comprising:
at least one handle;
a frame connected to the handle;
at least one support wheel;
a frontal debris bin;
a plurality of drive wheels; and
a finned tube housing located between the drive wheels, the finned tube housing further comprising:
two or more ceramic magnet blocks forming a magnetic assembly;
a sealed non-magnetic finned tube; and
one or more rotating non-magnetic fins;
wherein the magnet blocks are continuously cleaned off as the magnetic sweeper apparatus is pushed forwards in the direction of operation;
wherein magnetic debris accumulates on the magnet assembly and is deposited in the frontal debris bin;
wherein the apparatus design utilizes magnetic field differences created by the magnet position and angle to achieve the automatic pick-up and drop-off of debris at different locations of the magnet assembly;
wherein the two or more ceramic magnet blocks in the magnet assembly are stacked to create a larger magnetic field;
wherein the ceramic magnet blocks are magnetized in alternating directions, alternating between south and north, creating stronger points in the magnetic field along the magnet assembly;
wherein the magnetic assembly is located between the drive wheels.

2. The apparatus of claim 1 wherein the magnet assembly is configured to house ceramic magnets.

3. The apparatus of claim 1 wherein the dimension of the apparatus is at least 31.46" wide and 39.23" height.

4. The apparatus of claim 1 wherein the dimension of the apparatus from the front to the back wheel is 14.26" and the dimension from the front to the tip of the handle is 38.90".

5. The apparatus of claim 1 wherein the metallic debris includes one or more steel shots.

6. The apparatus of claim 1 wherein the non-magnetic fins at the back of the finned tube housing functions as scoops to help hold the steel shots during transportation and the non-magnetic fins at the front of the finned tube housing functions as ramps to help guide the steel shot into the debris bin.

7. The apparatus of claim 1 wherein the metallic debris is picked up by the strong magnetic field at the bottom of the apparatus and the weak magnetic field on the top allows the steel shots to separate from the finned tube and discharge into the debris bin.

8. The apparatus of claim 1 wherein the magnet assembly has a length of 24", consisting of different size ceramic magnetic blocks, the ceramic magnetic blocks having dimensions of 1" length, 2.5" width and 6" height, or 0.5" length, 2.5" width and 6" height and the ceramic magnets are magnetized in alternating directions, alternating between south and north.

9. The apparatus of claim 1 wherein the magnetization directions are alternating in the magnet assembly wherein the ceramic magnet assembly will have similar strength to a rare earth magnet assembly.

10. A method of sweeping metallic debris, using a continuous discharge ceramic powered magnetic sweeper apparatus, the apparatus comprising a handle, a frame, a support wheel, a frontal debris bin, drive wheels, a finned tube housing a magnetic assembly, the method comprising the steps of:
operating the apparatus forwards;
attracting metallic debris on the ground to the bottom surface of the apparatus;
lifting the metallic debris in the rotation of operation as the drive wheel rotates the finned tube as the housing rotates in the same direction; and
depositing the metallic debris into the debris bin;
wherein the magnet is continuously cleaned off as the magnetic sweeper apparatus is pushed forwards in the direction of operation;
wherein magnetic debris picks up by the magnet assembly and is deposited in the frontal debris bin;
wherein the apparatus design utilizes magnetic field differences created by the magnet position and angle to achieve the automatic pick-up and drop-off of debris at different locations of the magnetic assembly;
wherein the magnetic assembly further comprises two or more ceramic magnet blocks;
wherein the ceramic magnet blocks are magnetized in alternating directions, alternating between south and north, creating stronger points in the magnetic field along the magnet assembly;
wherein the magnetic assembly is located between the drive wheels.

11. The method of claim 10 wherein the magnet assembly is configured to house ceramic magnets.

12. The method of claim 10 wherein the dimension of the apparatus is at least 31.46" wide and 39.23" height.

13. The method of claim 10 wherein the metallic debris includes one or more steel shots.

14. The method of claim 10 wherein the non-magnetic fins at the back of the finned tube housing functions as scoops to help hold the steel shots during transportation and the non-magnetic fins at the front of the finned tube housing functions as ramps to help guide the steel shots into the debris bin.

15. The method of claim 10 wherein the metallic debris is picked up by the strong magnetic field at the bottom of the apparatus and the weak magnetic field on the top allows the steel shots to separate from the finned tube and discharge into the debris bin.

16. The method of claim 10 wherein the magnet assembly has a length of 24", consisting of different size ceramic magnetic blocks, the ceramic magnetic blocks having dimensions of 1" length, 2.5" width and 6" height, or 0.5" length, 2.5" width and 6" height and the ceramic magnets are magnetized in alternating directions, alternating between south and north.

17. The method of claim 10 wherein the magnetization directions are alternating in the magnet assembly wherein the ceramic magnet assembly will have similar strength to a rare earth magnet assembly.

18. The method of claim 1 wherein the dimension of the apparatus from the front to the back wheel is 14.26" and the dimension from the front to the tip of the handle is 38.90".

* * * * *